Feb. 6, 1968  W. T. GROVES ET AL  3,367,142
SLIP SPLINE ASSEMBLY
Filed May 31, 1966  2 Sheets-Sheet 1
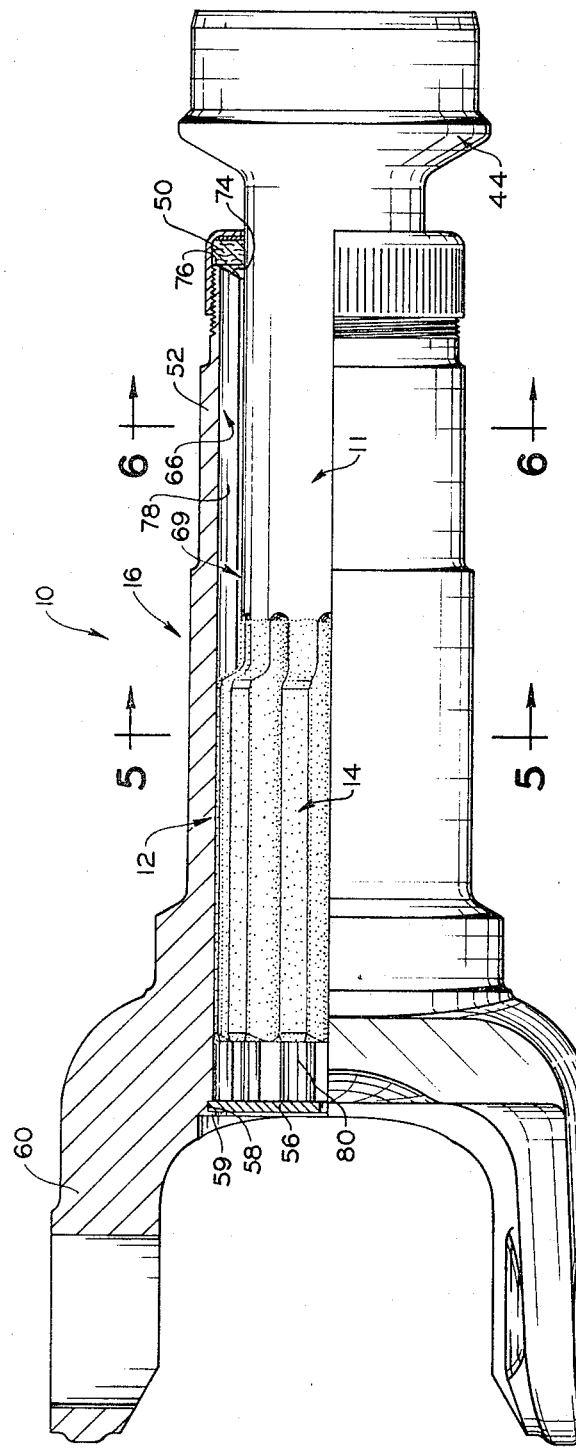
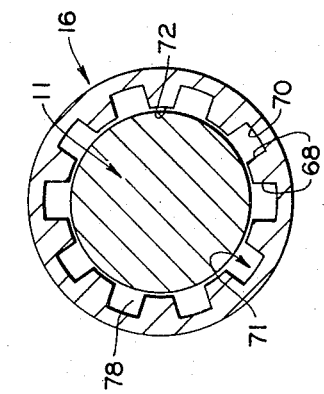
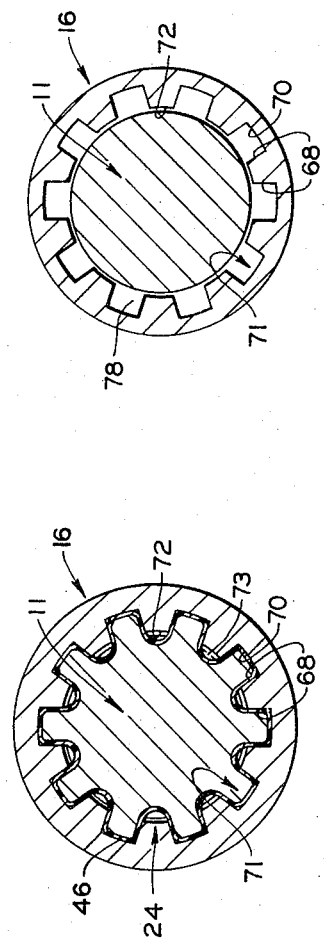
INVENTOR.
WILSON T. GROVES
RAYMOND F. LOWRY
BY Walter E. Pavlick
Harold D. Stall
Richard B. Forley
ATTORNEYS Feb. 6, 1968  W. T. GROVES ET AL  3,367,142
SLIP SPLINE ASSEMBLY
Filed May 31, 1966  2 Sheets-Sheet 2

INVENTOR.
WILSON T. GROVES
RAYMOND F. LOWRY
BY
ATTORNEYS

United States Patent Office 3,367,142
Patented Feb. 6, 1968

3,367,142
SLIP SPLINE ASSEMBLY
Wilson T. Groves, Toledo, and Raymond F. Lowry, Maumee, Ohio, assignors to Dana Corporation, Toledo, Ohio, a corporation of Virginia
Filed May 31, 1966, Ser. No. 554,132
10 Claims. (Cl. 64—23)

This invention relates to a slidable spline connection and, more particularly, to a torque transmitting slip spline assembly, the assembly having a relatively low coefficient of friction and thus non-seizure characteristics between the mating parts.

Slip joints per se have been utilized for many years for vehicle drive arrangements. When the rear wheels of a vehicle are set in motion or braked from high speed, the rear wheel assembly provides a thrust toward or away from the transmission thus tending to reduce or increase the distance between the rear wheel axle and transmission of the vehicle. Because the rear axle and the transmission are directly connected by a drive shaft, some mechanism, such as a slip joint in the drive shaft, must be employed to compensate for movement of the axle, or the transmission must be designed to absorb the heavy shock loads imposed. Normally, splined sections have been utilized in the slip joint assembly to transmit the high torque imposed but this subjects the splines to extremely high pressure on their surfaces when telescopically sliding due to the relative movement between the mating transmission and axle.

Various materials have been utilized for the fabrication of these splined sections in an attempt to reduce the friction force involved or, alternately, for resisting the high torque imposed. However, none of the materials utilized have proved completely satisfactory, for example, the use of steel splines results in high friction losses, noisy operation and occasionally galling or welding of the splined shaft and sleeve together under high loads. Splines of resilient or plastic materials provide a lower coefficient of friction but generally limit the torque load that can be transferred to the wheel axle because of their limited structural strength or dimensional stability.

Another method for overcoming the high friction loads imposed during sliding moving of the splined sections is by the use of a bearing means disposed between the mating parts to permit free telescoping movement during the transfer of high torque loads. Although slip spline assemblies utilizing such an arrangement have generally proved successful in operation, the additional structural elements required necessitate a more complex and expensive assembly.

Another method utilized in an attempt to overcome the high loading forces involved in splined slip joints has been the development of specialized lubricants to reduce the coefficient of friction between the relatively sliding parts. Although operating performance with these lubricants has been found satisfactory, upon leakage of the lubricant or severe applications, the mating parts are still subject to galling or seizure.

In an attempt to overcome the aforementioned disadvantages of the prior art, steel splined connections having specially prepared surfaces on their mating elements have been designed so that the high strength and dimensional stability of the underlying steel could be utilized to transmit the heavy loads while the mating surfaces would provide a lowered coefficient of friction. Examples of these special surfaces include: phosphate conversion coating; chrome-plating; coatings of molydisulfide; black oxide; and the use of nitride case hardening on the mating steel surfaces. None of these anti-friction surfaces have proved particularly practicable because of high wear rates, low durability or an insufficient lowering of the coefficient of friction.

Therefore, it would be advantageous to provide mating spline sections which provide the high structural strength of steel and yet have a surface with good wear resistance and a low coefficient of friction.

The use of nylon in small bearing parts for light loads has been widely adopted in recent years by industry. Among such applications are rollers in refrigerator drawer latches, drawer rollers in file cabinets and gears in speedometers. Nylon, however, has not proved successful in forming large bearing parts or when the nylon part was operated under heavy load, because of its relative dimensional instability and high cost. However, recent developments in the field of fluidized bed coating has permitted adhesion coating of metal parts with a thin nylon film such as films of polyhexamethylene adipamide, polyhexamethylene sebacamide or the polycaprolactams to obtain the wear characteristics, abrasion resistance and lowered coefficient of friction of nylon. Such coatings have largely eliminated the disadvantage of inherent dimensional instability and high cost.

Heretofore, however, application of a nylon coating to the mating surfaces of a high torque transmitting splined shaft has not proved commercially feasible. The provision, on a shaft having a non-uniform cross section, of a coating of sufficient thickness to insure a uniform, smooth surface and yet a coating thin enough to limit dimensional instability has required solution. Similarly, the proper form and shape of the surface of the underlying material had to be developed so as to provide a proper underlayment for the adhering coating and to prevent the formation of ridges or ripples during the fluidizing process. Additionally, the mating surfaces of the splined joint had to provide for possible cold flow of the nylon coating during actual load bearing operation.

Accordingly, it is an object of this invention to provide a high strength steel spline with a durable plastic surface having a low wear rate and low coefficient of friction.

It is an additional object of this invention to provide a shaft that is shaped to provide excellent adhesion for the coating of nylon or the like which is utilized.

It is another object of the invention to provide a splined shaft having a nylon surface for easy sliding with its mating sleeve.

Still another object of this invention is to shape the splines of the shaft so that the nylon coating of the shaft uniformly adheres thereto, and the splined shaft, when mated with the splined sleeve, provides graduated surfaces and clearance for possible cold flow of the nylon during operation under heavy loading.

Other objects and features of novelty of this invention will be either specifically pointed out or will become apparent when referring, for a better understanding of this invention, to the following description taken in conjunction with the accompanying drawing, wherein:

FIG. 1 is a longitudinal view partly in cross-section of a stub shaft and splined sleeve of the instant invention in assembled relation;

FIG. 5 is a cross-sectional view of the assembly taken generally on line 5—5 of FIG. 1 showing the mating engaged splines on the stub shaft and sleeve; and, FIG. 6 is a cross-sectional view of the assembly taken on line 6—6 of FIG. 1.

Figure 2:
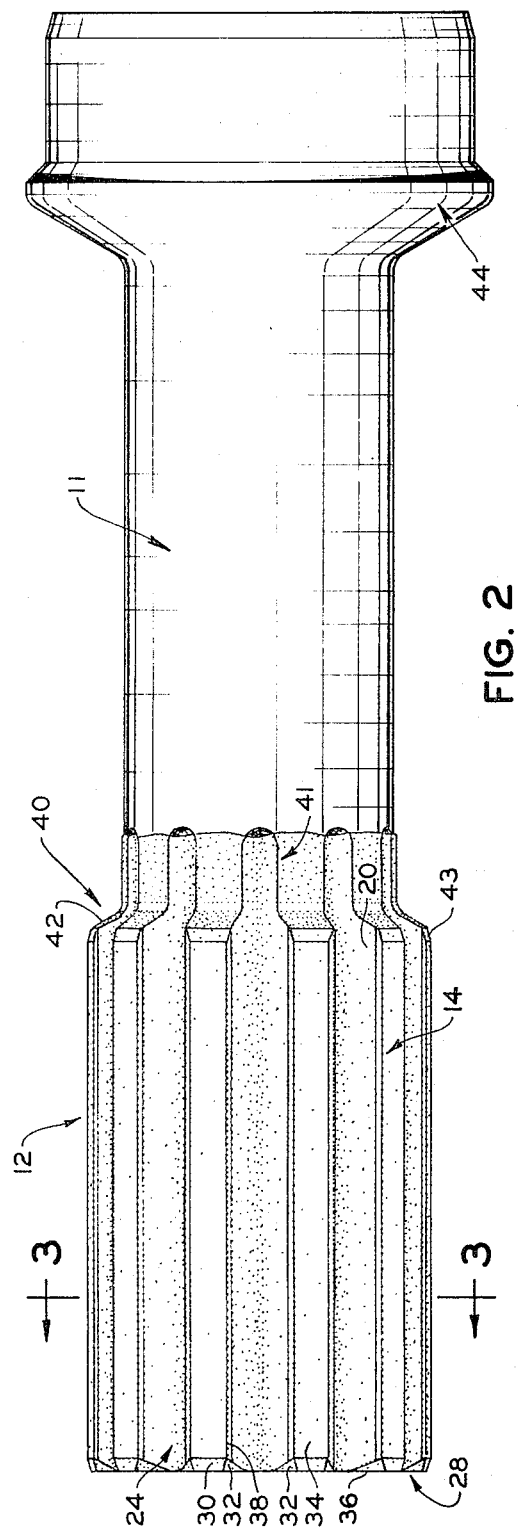
FIG. 2 is a view in elevation of the coated stub shaft of the present invention.

Now, referring more specifically to FIGS. 1-6 of the drawings for a better understanding of the invention, a slidable spline assembly 10 comprises a stub shaft 11 having an enlarged portion 12 formed into splines 14 that extend parallel to each other and axially along the length of the enlarged portion 12 of the shaft 11 (FIG. 2). The splines 14 are adapted for sliding engagement with a mating sleeve 16 which will be described in more detail later.

Each of the splines 14 is formed with side walls 20, 20 that extend along the spline length throughout the extent of the enlarged portion 12 and also extend radially inwardly of the shaft 11, with the side walls 20, 20 of each spline 14 in a relative parallel relationship. An outwardly open curved bottom 22 is formed between adjacent side walls 20, 20 of a pair of the splines 14 to complete a generally U-shaped (in cross-section) groove 24 which provides the means for receiving the mating spline on the sleeve 16 and also provides means for the passage of joint lubricant and clearance for cold flow. The just described spline and groove shape is generally well-known and can easily be formed by any conventional manufacturing operation such as hobbing.

Figure 3:
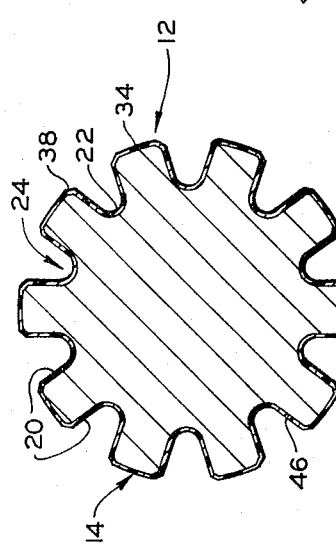
FIG. 3 is a cross-sectional view of the stub shaft taken on line 3—3 of FIG. 2.
Figure 4:
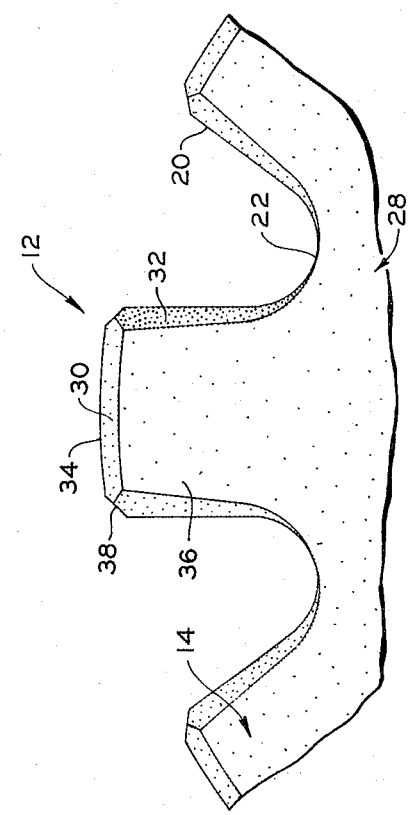
FIG. 4 is an enlarged end view of a portion of the splined end of the stub shaft of FIG. 2.

With particular reference to FIGS. 2-4, it can be seen that the forward or leftward end 28 of the stub shaft 11 includes relatively small chamfers 30 and 32. The chamfer 30 extends radialy inwardly and leftwardly from the outer peripheral surface or face 34 of each of the splines 14 at approximately a 15° angle to the axial direction and terminates at the end face 36 of the spline 14.

Chamfers 32, 32 are formed on the side walls 20, 20 of each spline 14 and extend inwardly generally radially and leftwardly at approximately a 20° angle to the axial direction and also terminate at the end face 36. Although the length of these chamfers may be varied, for convenience, a length of approximately 0.1" measured along the spline 14 before chamfering has been found sufficient to provide smooth angled rather than sharp edges at the spline end faces 36 to thereby aide in the assembly of the stub shaft 11 and sleeve 16 and insure a smooth and uniform surface for the nylon coating at this end of the shaft.

Each of the splines 14 is also provided with a chamfer 38 at the intersection of each of the side walls 20 and outer face 34 of the spline. This chamfer extends along the entire axial extent of the outer face 34. The chamfers 38 are advantageously angled at approximately a 45° angle with the sides of the splines to a depth approximating .016". The chamfers 38 function as a means for providing a surface on which a smooth and uniform nylon coating may adhere and additionally a means for providing a clearance space between the mating splined shaft 11 and sleeve 16 for possible cold flow of the nylon coating during actual operation.

The splines 14 at their rearward or rightward end 40 are smoothly terminated by a taper 42, furnishing a smooth transition between the enlarged shaft portion 12 and the remainder of the shaft. A chamfer 43, similar to the chamfer 30, breaks any sharp edges at this rearward end 40 of the splines 14. As is conventional in splined slip joints, the round bottomed portion 22 of the groove 24 extends beyond the taper 42 to provide a spline runout portion 41 so that there is a gentle merging of the grooved and ungrooved portions of the shaft 11. The extreme rightward end of the shaft 11 includes an attaching means 44 for attachment to a driveline member (not shown).

To obtain a shaft as just related, a forged blank of steel is machined, that is, the splines 14, taper 42, attaching portion 44 and chamfer 38 are machined to the shape previously described and heat treated either by induction or "through" heating and then quenched and tempered to provide a Rockwell hardness in the general range of 45–52 C which is desired for the heavy bearing loads imposed. The sides 20 of the "through" heated splines are then ground to insure that a close tolerance fit is maintained between the stub shaft 11 and mating sleeve 16 to provide the required clearance between the mating elements. This grinding step is normally necessary since "through" heat treating of the stub shaft tends to twist, misalign and change the dimension of the splines and such cause high localized bearing pressures and consequent gouging and peeling of the nylon coating and seizure of the sleeve 16 and stub shaft 11. The induction hardened spline shafts are machined prior to heat treatment, and, if required, the sides 20 of the spline are ground. In such case, grinding of the sides 20 is not always required since it is necessitated by "spline wind" occasioned by heat treatment or by hobbing with slightly worn tooling. Therefore, it is within the contemplated invention to eliminate side grinding of stub shafts which are induction hardened. Since distortion of these shafts is minimal from the induction heating process on many parts, no grinding of the stub shaft spline sides of such parts is required after heat treating.

The nylon adhesion coating indicated by the numeral 46 and best seen in FIGS. 2-4 is preferably applied to the machined and ground stub shaft 11, just described, by a fluidized bed coating process that comprises the utilization of a pulverant granular material, maintained in a fluidized state by gas flow, as an adherent coating that coalesces on the surface of the element to be coated because of the element's elevated temperature. This general process is described more fully, for example, in United States Patent Number 2,844,489 and specific reference is made thereto for a more general disclosure of the operation and theory of the fluidized bed coating process.

No nylon coating is formed on the mating sleeve 16 of the instant invention since it has been found, by test, that the use of a metal to nylon sliding bearing surface exhibits much better abrasion, wear and friction characteristics than a nylon to nylon friction bearing surface.

As illustrated in FIG. 2, the coating 46 extends over the entire enlarged portion 12 of the stub shaft, including the shaft end 28, and extends beyond the enlarged portion coating the extremities of the grooves 24 so as to insure that the entire bearing surface of the stub shaft 11 is encased in the nylon coating.

It has been found that a substantially uniform nylon coating thickness of between .006" and .025", as coated, provides the required characteristics of the instant invention since such a thickness insures a smooth, covering, uniform coat and, at the same time, limits to a great extent the dimensional instability of the applied nylon. However, it has been found preferable to hold the coating thickness as coated within .009"–0.12" thick since thinner coatings require more care in insuring complete coverage and thicker coatings become somewhat uneconomical and are subject to greater cold flow variations. The desired substantially uniform thickness is obtained by the use of a proper preheat temperature and immersion time and agitation for the shaft and the aforementioned specific shaft arrangement.

To insure that there is good adherence between the nylon coating 46 and the heat treated shaft 11, the shaft must first be properly cleaned and a preferred method is that of shot blasting and the use of a standard commercial cleaner such as, a chlorinated solvent to remove any possible heat treatment scale and oil or other contaminants remaining after the grinding operation. A ketone based primer solution especially formulated for use with nylon coatings is next applied to the shaft to serve as a base for the nylon coating. One commercially obtained primer solution utilized successfully for a coating base has the following physical properties:

| | |
|---|---|
| Color | Amber. |
| Solids by weight | 10%. |
| Viscosity at 74° F. | #1 Zahn cup—26 sec. |
| Drying time at 74° F. | 8 min. |
| Flash point closed cup | 46° F. |
| Specific gravity | 0.876. |
| Weight 1 gal. | 7.3 lbs. |

Such a primer is sold under the trademark "Corvel" NC Primer, by the Polymer Corporation, Polymer Processes, Inc., Reading, Pa. The primer is preferably applied to the shaft by dipping but other methods such as spraying or the like may be utilized. To eliminate any bubbles or thickened portions of the primer, the shaft is then blotted or blown with compressed air and permitted to air dry until tack free (5–15 minutes). This step provides a primer coating that averages .0001″ thick. In the preferred form of the invention the prime coat was applied by dipping (4–5 seconds), a uniformity of coating being obtained by a slow and constant removal rate of the shaft 11 from the dip tank (approximately 2″ per second).

Preheat is then applied to the shaft, care being taken to insure that the aforementioned tack free condition of the primer coating is obtained upon air drying and prior to preheat so that there is no danger from unevaporated inflammable portions of the ketone base of the primer during preheat and to insure that no bubbles are formed. The temperature range of preheating is preferably maintained between 475° and 600° Fahrenheit with the shaft subjected to this temperature for a sufficient time to bring the surface and a substantial portion of the sub-surface thereof within the required range since heating, within these limits prevents substantial reduction in the hardness of the shaft (generally less than three points on the Rockwell C scale) and insures that the primer is not over heated, causing cracking and an apparent chemical change thereto so that there is ineffectual adherence of the nylon coating.

The nylon coating area of the shaft is then placed in a fluidized bath of powdered nylon for a time generally between 2 to 6 seconds. The shaft is agitated, such as by rotation or reciprocation, during this time to insure that all portions are coated equally. After the elapsed time the shaft is removed from the fluidized bath and the shaft is immediately shaken to remove excess nylon powder from its surface. The shaft may then be allowed to cool in still air to enable forming of a continuous uniform coating by the complete fusing of any individual discrete powder particles remaining. Such fusing may also be accomplished by post heating the shaft for a short time, 3 minutes having been found sufficient, at the preheat temperature so as to insure complete coalescence of the coating. Although the postheated shaft may then be permitted to cool in still air to fuse the coating it has been found more desirable that the post heating be followed immediately by quenching of the cooled shaft in room temperature water to improve the crystalline structure of the nylon coating. This additional post heating and quenching operation is preferred in the practice of the invention because of the advantages of the assurance of complete fusion of the coating and improved crystalline structure thereof which provides improved wear and abrasion resistance.

Typical physical characteristics of a commercially obtained nylon powder sold under the trademark, "Corvel" NCA–77 nylon and obtained from the same supplier as the primer are given by the supplier as follows:

| | |
|---|---|
| Color | Black. |
| Coverage | .055 lb./sq. ft./10 mil. coating. |
| Specific gravity | 1.04 (fused). |
| Bulk density | 4 lbs./gal. (powder as supplied). |
| Melting point | 365–375° F. |
| Tensile strength | 8,000 p.s.i. |
| Dielectric constant (at 20° C.) | 3.7 (dry). |
| Dielectric constant (at 20° C.) | 3.09 (100% R.H.). |
| Water absorption | 2 wks. at room temperature 1.6% by weight. |
| Approximate hot flow temp. | 200° F. |
| Coefficient of friction of formed coating | .09, approximately (steel on nylon-lubricated). |
| Hardness | 45–120 Rockwell R. (at 73° F.). |

| Et creep * (p.s.i.): | Time (hour) |
|---|---|
| 180,000 | 1 |
| 165,000 | 10 |
| 140,000 | 100 |
| 120,000 | 1,000 |

* A decrease of force with time required to produce a constant strain is relaxation, and this force is utilized to calculate the relaxation modulus. Time Dependent Relaxation Modulus Creep (Et) represents the deformation with time under a constant load of elasticity for a typical nylon.

The above described method of manufacture results in a stub shaft having a uniform, smooth, closely adhering nylon coating with no bubbles or ridge lines around the shaft periphery. The thickness of coating is substantially constant throughout the coated area and falls well within the thickness range previously set out. Further, no unmelted granules of nylon are discernible on the surface of the coating, the entire nylon deposit being fully coalesced by fusing.

Since the thickness of the nylon coating is not completely uniform as coated, the stub shaft is preferably ground after coating so that there is no interference fit between the peripheral surface 34 and the splined sleeve 16. This grinding trues the peripheral surface 34 of the stub shaft 11 and brings the diameter thereof within desired operating tolerances. However, such grinding does not, in any case, reduce the coating thickness at any point on the peripheral surface 34 of the stub shaft below .005″. No machining is required for any of the other surfaces of the stub shaft so that, as completed for assembly, the stub shaft 11 has a nylon coating whose thickness ranges from .005″–.025″, with the desired range being between .005″–.012″ for the stub shaft, as a whole, and .009″–.012″ for all but the peripheral surface 34.

As can be seen in FIGS. 1 and 5, the splined sleeve 16, which forms the outer portion of the slip joint assembly is mated in a telescopically engaged relation with the spline shaft 11 so as to permit non-rotative longitudinal sliding relative movement therebetween. A seal 50 is screwingly attached on a tubular portion 52 at the end of the sleeve 16 and extends radially inwardly to slidingly and sealingly engage the shaft 11 so as to seal the rightward end of the assembly 10 against the instrusion of dirt or dust and also to present a means for prevention of lubricant escape. On the leftward end of the splined sleeve, a Welch plug 56 is disposed within a counter bore 58 provided on the inner periphery of the sleeve 16, the plug being held in this counter bore by a turned over edge 59 on the sleeve 16 so that the plug 56 seals this end of the slip joint assembly. An extension 60 on the sleeve provides a yoke for conventional attachment to a journal cross of a universal joint (not shown).

Splines 66, formed on the internal periphery of the sleeve 16 and extending therealong for substantially its full length, are shaped and dimensioned to mate with the splines 14 on the shaft 11. Each of the splines 66 extends radially inwardly from the inner periphery of the sleeve 16 proper and include straight side walls 68 that converge inwardly to thereby form a generally wedge shaped spline, which side walls 68 abut against the nylon coating 46 on the side walls 20 of the stub shaft splines to provide a torque transfer surface therebetween. An outer groove wall 70 forms the root portions of adjacent splines 66 to form the remaining side of the groove 71 into which the splines 14 extend, the wall 70 abutting the face 34 of the stub shaft 11 in a radial load bearing relation. The splines 66 are terminated by a radially inner face 72 which forms the innermost boundary of the splines 66. As can be seen (FIG. 5), the splines 66 do not extend completely into the groove bottom 22, that is, the inner face 72 of the sleeve spline does not abut the bottom of shaft 11, so that a clearance 73 for the circulation of lubricant and for the possible cold flow of the nylon coating 46 is thereby provided. Similarly, to the chamfer 30 on the stub shaft 11, a chamfer 74 is provided on the right end 76 of each spline 66 so that, upon initial assembly, lead in for centering is obtained.

Turning to FIG. 6 is can be seen that a variable volume clearance 78 is provided between the rightward neck portion 69 of the stub shaft 11 and the sleeve 16. Upon assembly a high pressure grease, such as a grease sold under the trademark, "Marfek" EP #1 is inserted in the splined sleeve assembly 10. As the sleeve and stub shaft slidably expand relative to one another the grease is forced from the clearance 78 providing a lubricant reservoir at the rightward end of the assembly 10 into the increasing space 80 between the left end 28 of the stub shaft and the Welch plug 56, forming a lubricant reservoir at the leftward end of the assembly 10. Alternately, as the stub shaft 11 and sleeve 16 slide in relative telescoping movement the high pressure grease in the assembly is forced from the contracting space 80 between the Welch plug and stub shaft end and moves into the clearance space 78.

The aforementioned sleeve is supplied as a forging or casting which is through heated and then quenched and tempered to provide a Rockwell hardness of 22–27 on the C scale. After heat treating, the sleeve is broached to form the splines and chamfers thereon and is then ready for assembly with its mating stub shaft; the other surfaces of the sleeve also being suitably machined.

As previously set out, it is extremely important that the mating surfaces on the spline and sleeve be closely fitted to prevent pounding, back lash or chattering and consequent damage as the spline and sleeve assembly telescopically move while under heavy torque loading. As exemplary of this fact, a specific example of a mating sleeve and coated stub shaft, representative of this invention, are now given:

Sleeve:

| | |
|---|---|
| Diameter between inside spline faces of sleeve | 2.026″. |
| Width of grooves between splines | 0.3892″. |
| Diameter between outside groove faces (bottom to bottom of groove) | 2.4992″. |
| Number of splines | 10. |
| Type material | Steel, SAE 1140. |
| Rockwell hardness as heat treated | 25 Rockwell C. |

Stub shaft, (before coating):

| | |
|---|---|
| Diameter of splines at outer face | 2.484″. |
| Diameter at the outermost beginning of the roots of splines portion 22 | 2.0125″. |
| Width of spline before coating | 0.3645″. |
| Length of spline | 4.000″. |
| Length of splines grooves | 4.750″. |
| Type material | Steel, SAE 1141. |
| Rockwell hardness as heat treated | 48 Rockwell C. |
| Number of splines | 10. |

Stub shaft, (after coating):

| | |
|---|---|
| Diameter of splines at outer face | 2.504″. |
| Diameter of splines at outer face after grind | 2.4977″. |
| Thickness of coating | .009″–.011″. |
| Width of spline | 0.385″. |
| Length of shaft coated | 4.750″. |
| Preheat temperature | 530° F. |

The advantages of the invention become more apparent when test results are given comparing a coated and uncoated shaft (having the same dimensions as the coated shaft) mated with an uncoated sleeve, the shafts and sleeve having the general dimensions set out above. The below enumerated results represent load readings taken at room temperature with the slip spline assembly lubricated by a grease sold under the trademark, "Marfak" EP #1.

COATED STUB SHAFT

| Applied Torque (ft.-lb.) | Axial Force (lb.) required to cause slipping | Coefficient of friction |
|---|---|---|
| 10 | 30 | 0.265 |
| 40 | 48.75 | 0.108 |
| 80 | 83.75 | 0.093 |
| 120 | 123.75 | 0.091 |
| 160 | 153.75 | 0.085 |
| 200 | 190 | 0.084 |

UNCOATED STUB SHAFT

| | | |
|---|---|---|
| 10 | 67.5 | 0.59 |
| 40 | 117.5 | 0.261 |
| 80 | 185 | 0.209 |
| 120 | 267.5 | 0.198 |
| 160 | 345 | 0.190 |
| 200 | 410 | 0.180 |

It can easily be seen that the coated shaft provides considerably lower coefficient of friction and consequent lowered axial sliding force than the uncoated shaft at all loadings and that such lowered coefficient of friction results in a spline and sleeve assembly which slides easily when in actual operation with no thumping or intermittent seizing in the sliding movement. In addition to this lowered coefficient of friction, the wear rates and abrasion resistance of the nylon coated shaft have been found to be considerably higher than those offered by an uncoated shaft.

Since the coated shaft in operation will sustain heavily imposed loading, it is apparent that the inherent dimensional instability of nylon will engender some cold flow of the coating. It is contemplated, as a feature of this invention, that any flow due to radial loading will be accommodated by the chamfers 38, that is, any movement of the coating on the outer spline surface 34 will be around the spline towards the side walls 20 of the spline due to the clearance afforded by the chamfers 38. Additionally, any cold flow due to the torque load imposed on the side walls 20 of the splines 14 will be accommodated by the clearance 73 afforded by the groove formed by the curved bottom 22 of the stub shaft 11, that is, any flow of the nylon coating will be down into clearance 73. In the event that there is some slight cold flow longitudinally of the shaft, the clearance provided by the chamfers 30 and 32 and the spline taper 42 and chamfer 43 provide clearance for accommodating the same. Thus, even though extremely close mating has been maintained between the spline sleeve and the spline shaft, provision has been made for cold flow of the coating to prevent local build-up and thickening thereof and consequent seizing between the mating parts.

Although the present invention has been described in connection with a certain specific example thereof, it is not intended to be limited thereby except as defined in the appended claims. For example, the nylon coating 46 could be extended along the surface of the stub shaft 11 so as to coat at least part of the tapered section of the attaching portion 44. Such a modification would eliminate any masking or cleaning of this area and eliminate grinding of the shaft stem and fillet radius. The elimination of the grinding operation precludes the possibility of forming a grinding step and a stress riser at the grind run-out in the fillet radius. Further, this extension of the nylon coating would provide a smooth surface and thereby insure a satisfactory seal, without grinding, between the shaft and sleeve.

What is claimed is:

1. In a drive shaft slip spline assembly, the combination including: (a) an axially extending shaft, (b) an axially extending sleeve surrounding said shaft, (c) splines integral with said shaft and extending generally radially outwardly, (d) splines integral with said sleeve and extending generally radially inwardly, (e) each of said splines on said shaft having side walls extending longitudinally of said shaft, said splines terminating outwardly in faces forming the outermost peripheral portion of said stub shaft, (f) a round bottom portion disposed between a pair of flat side walls on adjacent splines on said shaft to form a groove therebetween, (g) a nylon coating adheringly deposited on said shaft to form a load bearing friction surface therealong, (h) said splines on said sleeve having side walls extending longitudinally along said splines, said side walls on each of said splines extending inwardly, said splines on said sleeve terminating radially inwardly by inward faces forming the innermost peripheral portion of said sleeve, (i) said sides of said sleeve splines terminated radially outwardly by outward faces that space said sleeve splines peripherally from one another to thereby form grooves therebetween, (j) said splines on said sleeve and said splines on said shaft being in inter-fitted engagement, said splines on said shaft being disposed in said grooves in said sleeve and the splines on said sleeve being disposed in grooves on said shaft, (1) each of said side walls on said sleeve abuttingly engaging a coated side wall on said shaft, (2) each of said outward faces on said sleeve abuttingly engaging said coated outward faces on said shaft, (3) chamfered portions on each of said splines on said shaft spacedly displaced from the adjacent side wall and outer face of the engaging sleeve spline, (4) each of said round bottomed portions of said shaft spacedly displaced from said inner faces of said sleeve spline, (k) whereby under load bearing relationship said spline and shaft are freely telescopically movable and said grooves formed by said round bottom portions provide clearance for cold flow of said coating.

2. The drive shaft slip spline assembly set forth in claim 1 wherein chamfered portions are disposed between each of said side walls and said face of said splines of one of said shaft and said sleeve to provide clearance for cold flow of the nylon coating.

3. The drive shaft slip spline assembly set forth in claim 1 wherein the nylon coating thickness ranges from .005″–.025″ on said shaft.

4. In a drive shaft slip spline assembly, the combination including; (a) an axialy extending shaft, (b) an axially extending sleeve surrounding said shaft, (c) splines integral with said shaft and extending generally radially outwardly, (d) splines integral with said sleeve and extending generally radially inwardly, (e) each of said splines on said shaft having parallel flat side walls extending longitudinally of said shaft, said splines terminating outwardly in faces forming the outermost peripheral portion of said stub shaft, (f) a round bottom portion disposed between a pair of flat side walls on adjacent splines on said shaft to form a groove therebetween, (g) chamfered portions disposed between each of said side walls and said face of each of said splines and extending longitudinally therealong, (h) a nylon coating adheringly deposited on said shaft to form a load bearing friction surface therealong, (i) said splines on said sleeve having flat side walls extending longitudinaly along said spline, said side walls on each of said splines diverging inwardly, said splines on said sleeve terminating radially inwardly by inward faces forming the innermost peripheral portion of said sleeve, (j) said sides of said sleeve splines terminated radially outwardly by outward faces that space said sleeve splines peripherally from one another to thereby form grooves therebetween, (k) said splines on said said sleeve splines peripherally from one another to there-engagement, said splines on said shaft being disposed in said grooves in said sleeve and the splines on said sleeve being disposed in grooves on said shaft, (1) each of said side walls on said sleeve abuttingly engaging a coated side wall on said shaft, (2) each of said outward faces on said sleeve abuttingly engaging said coated outward faces on said shaft, (3) said chamfered portions on each of said splines on said shaft spacedly displaced from the adjacent side wall and outer face of the engaging sleeve spline, (4) each of said round bottomed portions of said shaft spacedly displaced from said inner faces of said sleeve spline, (l) whereby under load bearing relationship said spline and shaft are freely telescopically movable and said grooves formed by said round bottom portions and said spaced displacement of said chamfered portions provide clearance for cold flow of said coating.

5. The drive shaft slip spline assembly set forth in claim 4 wherein the shaft has a Rockell hardness range of substantially 45–52 C and said sleeve has a Rockwell hardness range of substantially 22–27 C.

6. The drive shaft slip spline assembly as set forth in claim 4 wherein the shaft has a Rockwell hardness range stantially the full length of each of said splines on said shaft.

7. The drive shaft slip spline assembly of claim 4 wherein the nylon coating thickness ranges between .005″–.025″ on said outwardly disposed face on said shaft spline.

8. The drive shaft slip spline assembly of claim 4 wherein the nylon coating thickness ranges between .006″–.025″ on said coated side walls of said shaft spline.

9. The drive shaft slip spline assembly of claim 4 wherein the nylon coating thickness ranges between .009″–.012″ on the coated side walls of said shaft spline.

10. In a drive shaft slip spline assembly, the combination including: (a) an axially extending shaft including an enlarged portion terminating in a shaft end, (b) an axially extending sleeve surrounding said shaft, (c) splines formed at said enlarged portion, integral with said shaft and extending generally radially outwardly, (d) splines integral with said sleeve and extending generally radially inwardly, (e) each of said splines on said shaft having parallel flat side walls extending longitudinally of said shaft, said splines terminating outwardly in faces forming the outermost peripheral portion of said shaft, (f) a round bottom portion disposed between a pair of said flat sidewalls of adjacent splines on said shaft to form a groove therebetween, (g) chamfered portions disposed between each of said side walls and said face of each of said splines and extending longitudinally therealong, (h) chamfered portions disposed at said shaft end and extending angularly from said shaft end to each of said faces, (i) said round bottom portion extending beyond said flat side walls to form a spline runout portion, (j) said enlarged portion of said shaft terminated by a tapered portion opposite the shaft end, said tapered portion including chamfered portions extending to said spline face, said tapered portions and chamfered portions spacedly displaced from said sleeve, (k) a nylon coating adheringly deposited on said enlarged portion and said spline runout portion of said shaft to form a load bearing friction surface therealong, (l) said splines on said sleeve having flat side walls extending longitudinally along said spline, said side walls on each of said splines diverging inwardly, said splines on said sleeve terminating inwardly by inward faces forming the innermost peripheral portion of said sleeve, (m) said sides of each of said splines terminated outwardly by an outward face that spaces said sleeve splines peripherally from one another to thereby form grooves therebetween, (n) said splines on said sleeve and said splines on said shaft in mated engagement, said splines on said shaft being disposed in said grooves in said sleeve, said splines on said sleeve being disposed in said grooves on said shaft, said flat side walls on said shaft abutting against said flat side walls on said sleeve in load bearing relationship and said face on each of said shaft splines abutting against one of said outward faces on each of said sleeves, (o) whereby under load bearing relationship said sleeve and shaft are freely telescopically movable and said grooves formed by said round bottom portions and said spaced displacement of all of said chamfered portions and said tapered portion of said shaft provide clearance for cold flow of said coating.

References Cited
UNITED STATES PATENTS

| | | | |
|---|---|---|---|
| 1,496,236 | 6/1924 | Laughlin | 64—23 |
| 1,779,805 | 10/1930 | Dunwoodie | 64—1 |
| 2,198,654 | 4/1940 | Calkins et al. | 64—23 |
| 2,199,926 | 5/1940 | Swennes | 64—14 |
| 2,971,356 | 2/1961 | Reuter et al. | 64—9 |
| 3,066,503 | 12/1962 | Fleming | 64—23 |
| 3,321,935 | 5/1967 | Wildhaber | 64—14 |

MILTON KAUFMAN, *Primary Examiner.*

HALL C. COE, *Examiner.*

UNITED STATES PATENT OFFICE
CERTIFICATE OF CORRECTION

Patent No. 3,367,142                                February 6, 1968

Wilson T. Groves et al.

It is hereby certified that error appears in the above numbered patent requiring correction and that the said Letters Patent should read as corrected below.

Column 10, line 5, strike out "said sleeve splines peripherally from one another to there-" and insert instead -- sleeve and said splines on said shaft being interfitted --; line 27, strike out "the shaft has a Rockwell hardness range" and insert instead -- said chamfered side portions extend substantially --; line 28, strike out "stantially".

Signed and sealed this 8th day of April 1969.

(SEAL)
Attest:

Edward M. Fletcher, Jr.                                EDWARD J. BRENNER
Attesting Officer                                        Commissioner of Patents